United States Patent
Al Ibrahim et al.

(10) Patent No.: US 11,767,752 B2
(45) Date of Patent: Sep. 26, 2023

(54) METHODOLOGY FOR AUTOMATED VERIFICATION AND QUALIFICATION OF SIDEWALL CORE RECOVERY DEPTH USING BOREHOLE IMAGE LOGS

(71) Applicant: SAUDI ARABIAN OIL COMPANY, Dhahran (SA)

(72) Inventors: Mustafa Ali H Al Ibrahim, Safwa (SA); Vladislav Torlov, Dhahran (SA); Mokhles Mezghani, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 439 days.

(21) Appl. No.: 17/061,865

(22) Filed: Oct. 2, 2020

(65) Prior Publication Data
US 2022/0106871 A1   Apr. 7, 2022

(51) Int. Cl.
*E21B 47/09* (2012.01)
*E21B 47/053* (2012.01)
(Continued)

(52) U.S. Cl.
CPC ............ *E21B 47/09* (2013.01); *E21B 47/053* (2020.05); *G01V 11/002* (2013.01); *G06V 10/48* (2022.01); *E21B 25/16* (2013.01)

(58) Field of Classification Search
CPC ........ E21B 47/09; E21B 47/053; E21B 25/16; G06V 10/48; G01V 11/002
See application file for complete search history.

(56) References Cited

U.S. PATENT DOCUMENTS 3,069,654 A   12/1962   Hough
5,162,994 A   11/1992   Torres
(Continued)

FOREIGN PATENT DOCUMENTS

CN   104331885 A   2/2015
CN   103592690 B   9/2016
(Continued)

OTHER PUBLICATIONS

International Search Report and Written Opinion of the International Searching Authority issued in corresponding International Application No. PCT/US2021/053191, dated Jan. 21, 2022 (16 pages).
(Continued)

*Primary Examiner* — Michael J Dalbo
(74) *Attorney, Agent, or Firm* — Osha Bergman Watanabe & Burton LLP

(57) ABSTRACT

A method of determining the depth of a sidewall core sample taken from a borehole relative to a reference log of the borehole. The method includes obtaining a reference log recorded on a reference log depth scale and a borehole image log recorded on a borehole image log depth scale of a portion of the borehole from which the sidewall core sample has been taken. The method further includes generating a calibrated borehole image log from the borehole image log and the reference log and identifying a candidate sidewall core image artifact in the calibrated borehole image log. The method also includes assigning a confidence value for the candidate sidewall core image artifact based on a characteristic of the candidate sidewall core image artifact, and determining, using the confidence value, a probability that the sidewall core sample was collected at a certain depth on the reference log depth scale.

18 Claims, 9 Drawing Sheets

(51) Int. Cl.
*G06V 10/48* (2022.01)
*G01V 11/00* (2006.01)
*E21B 25/16* (2006.01)

(56) References Cited

U.S. PATENT DOCUMENTS

| | | | |
|---|---|---|---|
| 5,522,260 | A | 6/1996 | Chappellat et al. |
| 7,406,212 | B2 | 7/2008 | Mohamed et al. |
| 9,041,547 | B2 | 5/2015 | Hartmann |
| 9,053,389 | B2 | 6/2015 | Poyil et al. |
| 9,939,548 | B2 | 4/2018 | Burmester et al. |
| 10,121,261 | B2 | 11/2018 | Kherroubi et al. |
| 2015/0279093 | A1* | 10/2015 | Sung .............. G06T 17/05 345/419 |
| 2017/0286802 | A1 | 10/2017 | Mezghani et al. |
| 2020/0074588 | A1* | 3/2020 | Fouda .............. G06T 3/0068 |

FOREIGN PATENT DOCUMENTS

| | | |
|---|---|---|
| CN | 107507185 A | 12/2017 |
| DE | 102015205502 A1 | 9/2016 |
| KR | 20170103472 A | 9/2017 |

OTHER PUBLICATIONS

M.A. Garcia "Automatic Depth Matching for Petrophysical Borehole Logs", Aug. 28, 2020, XP055877739, pp. 15-28; figure 4.2 (66 pages).
Giorgino, T., "Computing and Visualizing Dynamic Time Warping Alignments in R: The dtw Package", Journal of Statistical Software, vol. 31; No. 7; Aug. 2009 (24 pages).
Hashmy et al.; "Wireline Coring Device Aids Evaluations of Complex Geologic Areas", SPE 14299; Society of Petroleum Engineers Inc.; Sep. 1985 (9 pages).
Itakura, F.; "Minimum Prediction Residual Principle Applied to Speech Recognition"; IEEE Transactions on Acoustics, Speech, and Signal Processing; vol. 23; No. 1; Feb. 1975; pp. 67-72 (6 pages).
Kiryati et al.; "A Probabilistic Hough Transform", Pattern Recognition; vol. 24; No. 4; 1991; pp. 303-316 (14 pages).
Lagraba P. et al.; "Borehole Image Tool Design, Value of Information, and Tool Selection", AAPG Memoir; vol. 92; Ch. 2; Jan. 1, 2010; pp. 15-38 (24 pages).
Leonardon et al.; "Exploring Drill Holes by Sample-taking bullets", SPE-939085-G; Petroleum Technology; vol. 132; Dec. 1, 1939; pp. 85-99 (15 pages).
Rourke, M. and Torne, J., "A New Wireline Rotary Coring Tool: Development Overview and Experience from the Middle East", SPE 149128; Society of Petroleum Engineers Inc.; May 2011 (9 pages).
Sakoe, H. and Chiba, S., "Dynamic Programming Algorithm Optimization for Spoken Word Recognition", IEEE Transactions on Acoustics, Speech, and Signal Processing; vol. 26, No. 1; Feb. 1978; pp. 43-49 (7 pages).
Stephens, R. S., "Probabilistic approach to the Hough transform", Image and Vision Computing; vol. 9.; Issue 1; Feb. 1991; pp. 66-71 (6 pages).
Xu et al.; "A new curve detection method: Randomized Hough Transform (RHT)", Pattern Recognition Letters; vol. 11; Issue 5; May 1990; pp. 331-338 (8 pages).
Yuen et al.; "Comparative study of Hough Transform methods for circle finding", Image and Vision Computing; vol. 8; Issue 1; Feb. 1990; pp. 71-77 (7 pages).
Torlov et al.; "Data Driven Assessment of Rotary Sidewall Coring Performance", SPE-187107-MS; Society of Petroleum Engineers Inc.; Oct. 2017 (22 pages).
Assous et al.; "Automated detection of planar geologic features in borehole images", Geophysics; vol. 79; No. 1; Jan. 2014; pp. D11-D19 (9 pages).
Jiang, L; "Efficient randomized Hough transform for circle detection using novel probability sampling and feature points", Optik; vol. 123; Issue 20; Oct. 2012; pp. 1834-1840 (7 pages).
Jung, J. and Ho, Y; "Depth Map Estimation From Single-View Image Using Object Classification Based on Bayesian Learning", 2010 3DTV-Conference: The True Vision—Capture, Transmission and Display of 3D Video; 2010; pp. 1-4 (4 pages).
Al-Sit, W. T.; "Automatic Feature Detection and Interpretation in Borehole Data", University of Liverpool; Jun. 2015 (130 pages).
Atherton, T.J. and Kerbyson, D.J.; "Size invariant circle detection", Image and Vision Computing; vol. 17; Issue 11; Sep. 1999; pp. 795-803 (9 pages).
Belougne et al.; "Real Time Speed Correction of Logging Data", SPWLA-1996-F; SPWLA 37th Annual Logging Symposium; Jun. 1996 (14 pages).
"Peakdet: Peak detection using MATLAB", Jul. 27, 2021; pp. 1-4; Retrieved from the Internet: URL:http://www.billauer.co.il/peakdet.html (4 pages).
Canny, J.; "A Computational Approach to Edge Detection", IEEE Transactions on Pattern Analysis and Machine Intelligence; vol. 8; No. 6; Nov. 1986; pp. 679-698 (20 pages).
Chan, David S. K.; "Accurate Depth Determination in Well Logging", IEEE Transactions on Acoustics, Speech, and Signal Processing; vol. 32; No. 1; Feb. 1984; pp. 42-48 (7 pages).
Cheung, P. S.; "Microresistivity and ultrasonic imagers: tool operations and processing principles with reference to commonly encountered image artefacts", Geological Society; vol. 159; Jan. 1, 1999; pp. 45-57 (13 pages).
Duda et al.; "Use of the Hough Transformation to Detect Lines and Curves in Pictures", Communications of the ACM; vol. 15; Issue 1; Jan. 1972; pp. 11-15 (5 pages).

\* cited by examiner

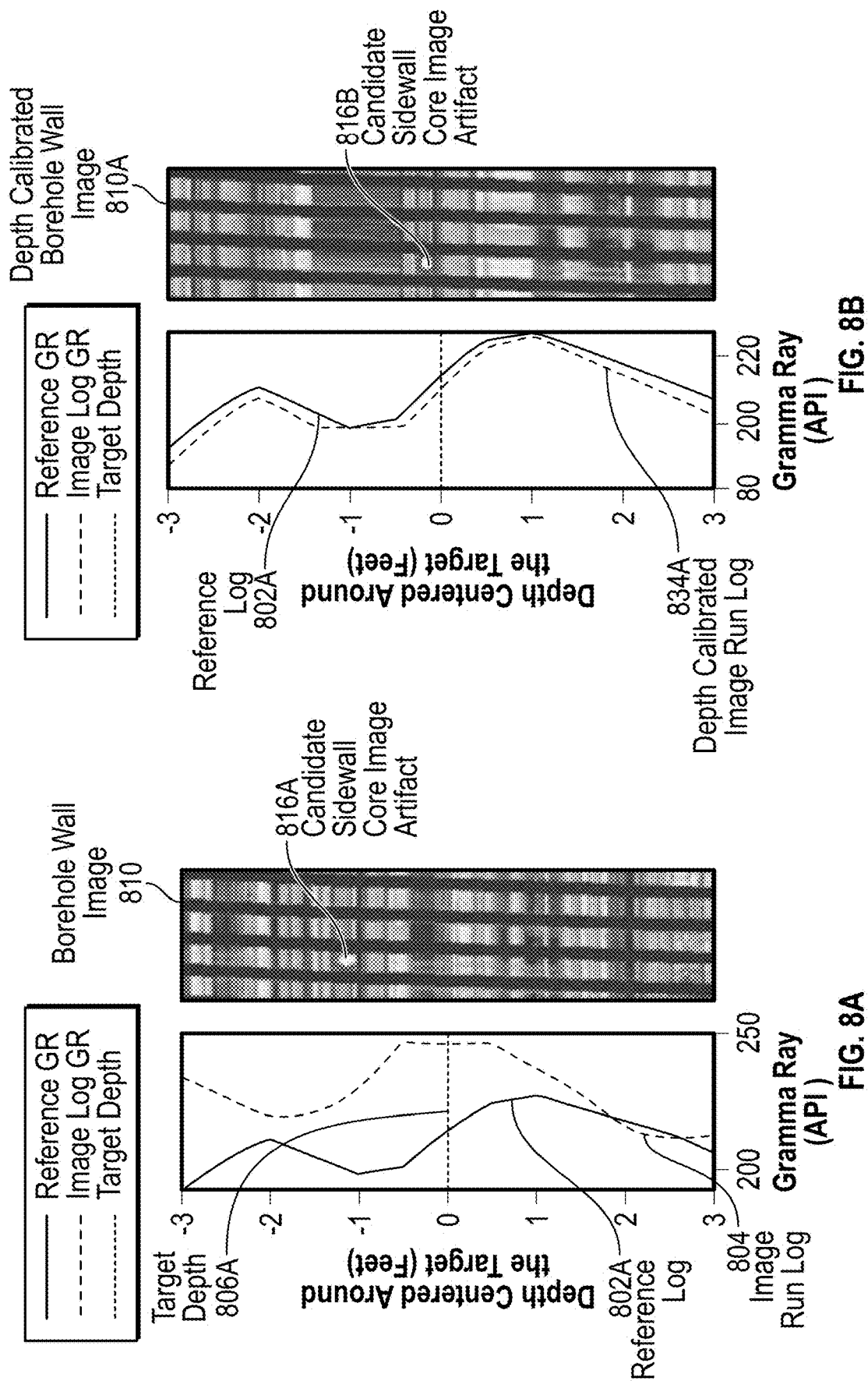

METHODOLOGY FOR AUTOMATED VERIFICATION AND QUALIFICATION OF SIDEWALL CORE RECOVERY DEPTH USING BOREHOLE IMAGE LOGS

BACKGROUND

Sidewall cores are commonly acquired in the oil and gas industry to provide samples of the rock formations penetrated by a borehole for lithological and petrophysical analysis. Optimal use of the lithological and petrophysical characteristics determined from the analysis requires knowledge of the precise depth from which the sidewall core was acquired.

The determination of depth of a borehole log along the borehole is commonly prone to error because the wireline cable used to lower and raise the measurement tool may stretch during the measurement run. This stretching may be caused by the measurement tool sticking against obstructions on the borehole wall, or due to frictional drag of the wireline cable where the wireline cable rubs against the borehole wall, or for other reasons. As a result relative depth errors may exist between measurements made on different measurement runs, and absolute depth errors may exist for all measurements.

Manual determination of the depths of the sidewall core sample point is a difficult, prone to error, time consuming and expensive task. Consequently, an automated process for determining the depth of sidewall core sample points is desirable.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments relate to a method of determining the depth of a sidewall core sample taken from a borehole relative to a reference log of the borehole. The method includes obtaining a reference log recorded on a reference log depth scale and a borehole image log recorded on a borehole image log depth scale of a portion of the borehole from which the sidewall core sample has been taken. The method further includes generating a calibrated borehole image log from the borehole image log and the reference log and identifying a candidate sidewall core image artifact in the calibrated borehole image log. The method also includes assigning a confidence value for the candidate sidewall core image artifact based on a characteristic of the candidate sidewall core image artifact, and determining, using the confidence value, a probability that the sidewall core sample was collected at a certain depth on the reference log depth scale.

In general, in one aspect, embodiments relate to a non-transitory computer readable medium storing instructions executable by a computer processor, the instructions including functionality for obtaining a reference log recorded on a reference log depth scale, and a borehole image log recorded on a borehole image log depth scale of a portion of the borehole from which the sidewall core sample has been taken. The non-transitory computer readable medium storing instructions executable by a computer processor, further include instructions for generating, a calibrated borehole image log from the borehole image log and the reference log and identifying a candidate sidewall core image artifact in the calibrated borehole image log. Finally, instructions for assigning a confidence value for the candidate sidewall core image artifact based on a characteristic of the candidate sidewall core image artifact, and determining, using the confidence value, a probability that the sidewall core was collected at a certain depth on the reference log depth scale, are included.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

FIGS. 8A and 8B show an example of borehole image log depth calibration, in accordance with one or more embodiment.

DETAILED DESCRIPTION

In the following detailed description of embodiments of the disclosure, numerous specific details are set forth in order to provide a more thorough understanding of the disclosure. However, it will be apparent that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the disclosure are directed to a method for automatically determining the precise depth at which a sidewall core sample has been acquired.

Figure 1:
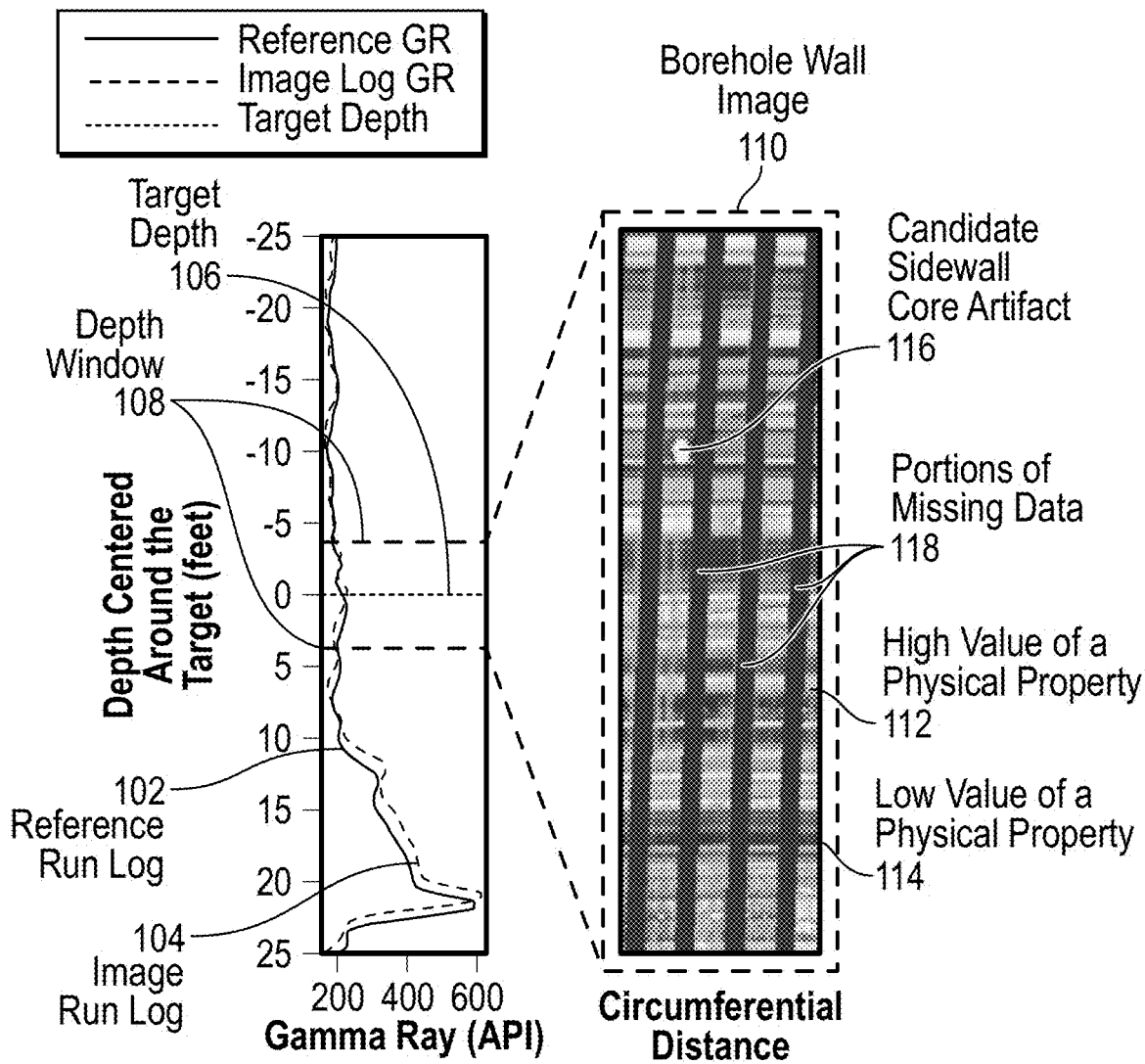
FIG. 1 is an example of borehole wall image data with a sidewall core artifact, in accordance with one or more embodiments.

FIG. 1 shows the input data, according to one or more embodiments. The input data include a reference log (102) recorded on a separate logging run, and which is used as a depth reference or standard. Any absolute errors present in this reference log (102) may be neglected. The reference log (102) may be of a physical quantity commonly recorded during borehole logging. For example, the reference log (102) may be a gamma log, or a resistivity log, or a density log. In the embodiment illustrated in FIG. 1, the reference log (102) is a gamma ray log.

The input data may further include an image run log (104). The image run log may be of the same physical quantity as the reference log (102). In the embodiment illustrated in FIG. 1, the image run log (104) is a gamma ray log. It may be seen that although the general shape and character of the reference log (102) and the image run log (104) are similar, they are not identical to each other. This difference is a result of the depth errors, as discussed above.

The input data may further include a borehole wall image (110) for at least a portion of the borehole wall. The borehole wall image may be obtained using ultrasonic transducers, or using electromagnetic transducers, or using radar transducers, or using visible light transducers. One of ordinary skill in the art may imagine other modalities for recording borehole wall images. The borehole wall image displays a physical property, for example signal reflection amplitude strength. Rock layers with high values of the physical property (112) may be distinguished from rock layers with low values of the physical property (114). Candidate side wall core artifacts (116) may also be visible on the borehole wall image. Dependent on the geometry and mode of operation of the borehole wall image tool the borehole wall image (110) may include data covering the entire borehole circumference or may include portions of the borehole wall where data is missing (118).

In accordance with one or more embodiments, the image run log (104) and the borehole wall image (110) may now be depth-calibrated to correct for errors in the measurement of depth along the borehole. The depth-calibration requires that the magnitude of depth-shift factors and depth-stretch factors needed to achieve a match between the image run log (104) and the reference log (102) be determined, and these depth-shift factors and depth-stretch factors be applied to the depth scale of the borehole wall image (110).

Figure 2:
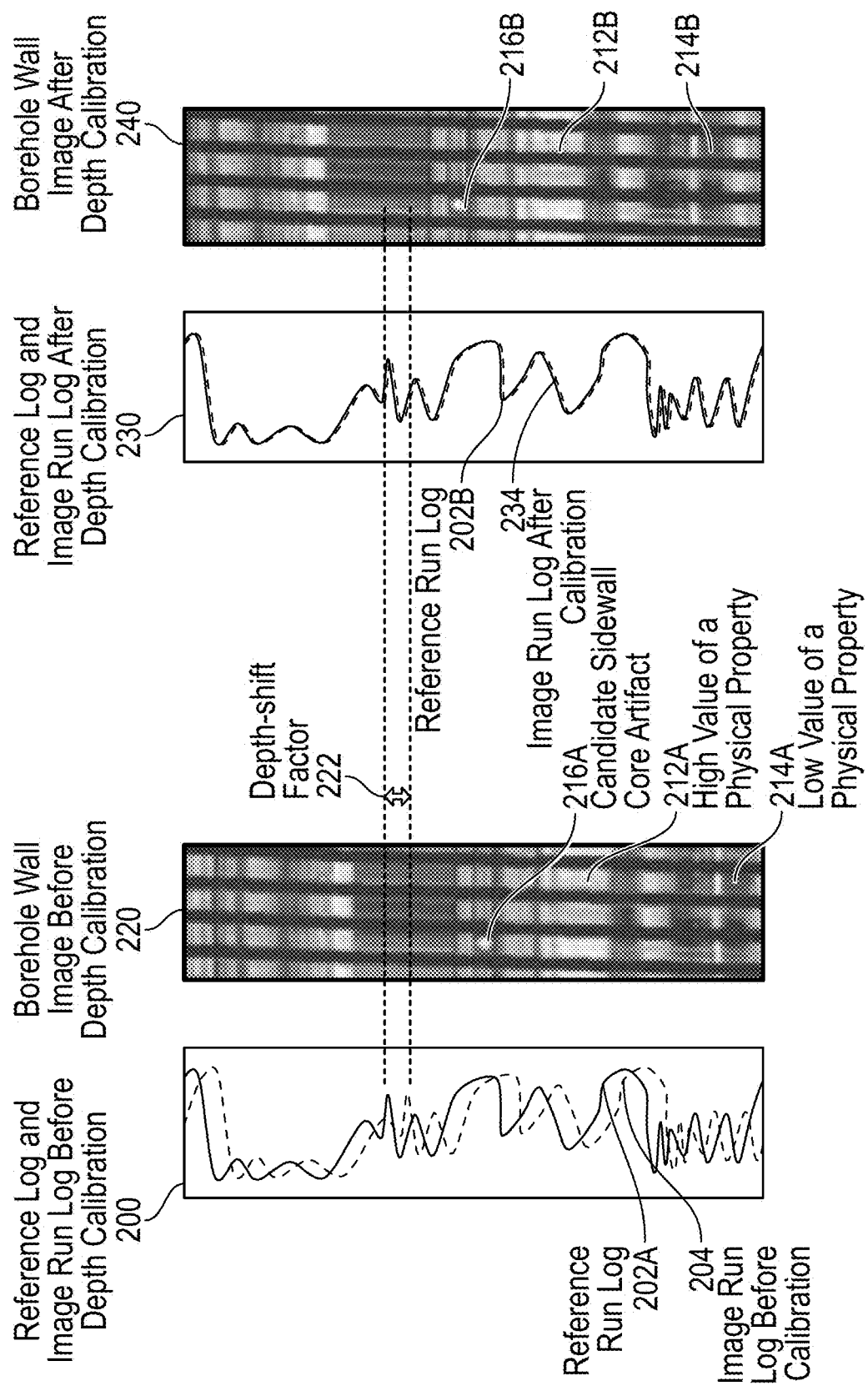
FIG. 2 shows an example of cross-correlation depth-calibration, in accordance with one or more embodiments.

One or more embodiments of depth-calibration may require that only a single depth-shift factor be calculated for, and applied to, the portion of the wellbore being depth-calibrated. FIG. 2 shows the results of one or more embodiments of a depth-calibration requiring only a single depth-shift factor. FIG. 2 shows the reference log and an image run log (200) before depth calibration. The depth-shift factor (222) between the reference log (202A) and an image run log (204) before depth calibration indicated may be determined using a cross-correlation between the image run log (204) and the reference log (202A).

Cross-correlation may be calculated as:

$$\mathbb{C}(\mathfrak{R} * \mathfrak{I})[\tau] = \sum_{z=-Z_1}^{Z_1} \mathfrak{R}[z] \mathfrak{I}[z+\tau] \qquad \text{Equation (1)}$$

where $\mathbb{C}(\mathfrak{R} * \mathfrak{I})$ denotes the cross-correlation of the reference log, $\mathfrak{R}$, with the image run log before depth calibration, $\mathfrak{I}$, and $\tau$ is the depth-shift.

In equation (1), z is the depth sample variable, and $Z_1$ denotes the limits of the depth-window over which the cross-correlation is calculated. While the cross-correlation is theoretically defined for any value of the depth-shift, in practice a maximum value is chosen to limit the computational time taken by the calculation of equation (1). In one or more embodiments, the depth-shift factor may be calculated by selecting the value of the depth-shift, $\tau$, corresponding to the maximum value of the cross-correlation $\mathbb{C}(\mathfrak{R} * \mathfrak{I})$.

FIG. 2 further shows an example of a borehole wall image before depth-calibration (220). Alternating bands of high values of a physical property (212A) and low values of a physical property (214A) may be seen, together with a candidate sidewall core artifact (216A). FIG. 2 also shows the reference log and the image run log after depth-calibration (230). The depth-calibration process has shifted the image run log after calibration (234) to match the reference log (202B).

Finally, FIG. 2 shows the borehole wall image after depth-calibration (240). The alternating bands of high values of a physical property (212B) and low values of a physical property (214B) and a candidate sidewall core artifact (216B) may all be seen moved in depth by and amount given by the depth-shift factor.

Cross-correlation depth-calibration may be used if the depth-shift factor is constant or nearly constant across a depth range, and the depth-stretch factor is zero or nearly zero across a depth range. However, in some cases, these constraints may not be met, and a more powerful depth-calibration method may be required. In one or more embodiments, dynamic warping may be used to determine the depth-shift factor and the depth-stretch factor.

Figure 3:
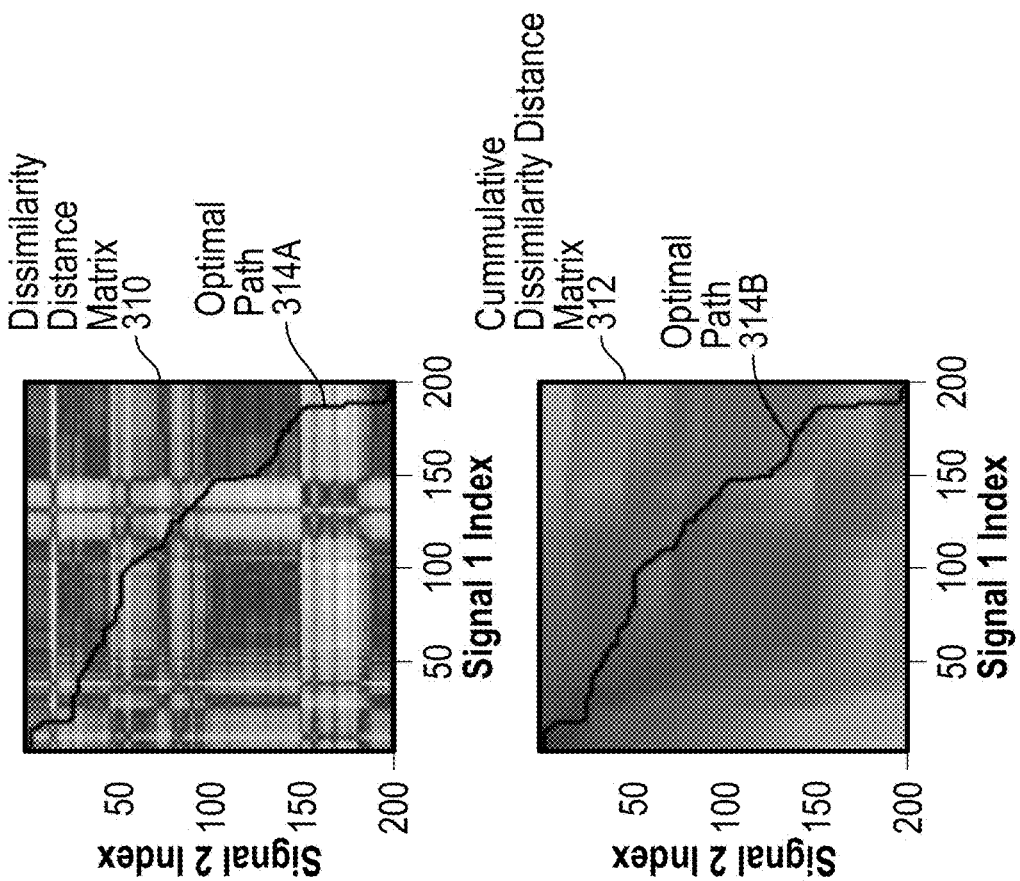
FIG. 3 shows an example of dynamic warping depth-calibration, in accordance with one or more embodiments.
Figure 3:
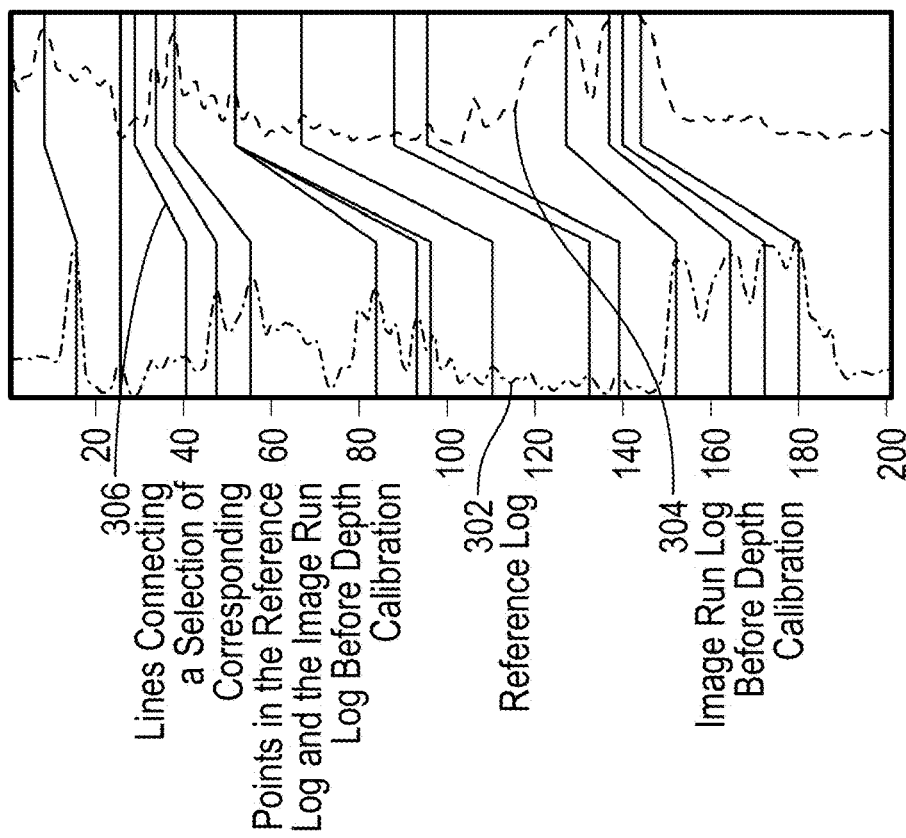

FIG. 3 shows the application of an embodiment of dynamic warping. Dynamic warping measures the similarity or dissimilarity distance between two signals. In some embodiments the signals are the reference log (302) and the image run log before depth-calibration (304). The algorithm is subdivided into three main steps: first the calculation of the dissimilarity distance matrix (310), second the calculation of the cumulative dissimilarity distance matrix (312), and third the determination of the optimal path (314A, 314B) in the cumulative dissimilarity distance matrix (312) that minimizes the total cumulative dissimilarity distance travelled.

In one or more embodiments, the dissimilarity distance measure may be Euclidean distance:

$$\Delta_E(\mathfrak{R}_i, \mathfrak{I}_j) = \sqrt{\sum_{s=1}^{S} (\mathfrak{R}_{i,s} - \mathfrak{I}_{j,s})^2} \qquad \text{Equation (2)}$$

where $\Delta_E(\mathfrak{R}_i, \mathfrak{I}_j)$ is the Euclidean dissimilarity distance matrix. $\mathfrak{R}_{i,s}$ is the value of log s at depth i derived from the reference log and $\mathfrak{I}_{j,s}$ is the value of log s at depth j derived from the image run log before depth-calibration. S is the number of logs used in the correlation.

The dissimilarity distance matrix (310) may be a two-dimensional matrix as shown in FIG. 2. The cumulative distance matrix may be calculated by minimizing the distance accumulated between the initial point and the final point based on a set of rules normalized by the number of steps travelled.

The optimal path (314A, 314B) may be determined using dynamic programming to obtain the best alignment between the reference log (302) and the image run log before depth-calibration (304) by minimizing the total cumulative dissimilarity distance, dtw, along the optimal path:

$$dtw(x_i, y_j) = \min(\sum_{k=1}^{K} w_{x_i, y_j, k}) \qquad \text{Equation (3)}$$

where the minimization is constrained by the boundary conditions, the requirement that the optimal path through the dissimilarity matrix is continuous and monotonic.

In equation (3) $x_i$, and $y_j$ are the values at i and j depths for signal x and y respectively. $w_{x,y,k}$ is distance between these two points up to step k, K is the total number of steps taken. The total number of steps may be used for normalization.

In one or more embodiments, the dynamic warping method described above may further include the use of a global search windows to constrain the search around the diagonal of the cumulative dissimilarity distance matrix, thereby decreasing the computational time needed for finding the optimal path (314A, 314B).

In accordance with one or more embodiments, the depth-shift factors and depth-stretch factors determined by the dynamic warping method may be applied to the image run log before depth-calibration (304) to obtain a depth-calibrated image run log. In accordance with one or more embodiments, the depth-shift factors and depth-stretch factors determined by the dynamic warping method may be applied to the borehole wall image to obtain a depth-calibrated borehole wall image. In accordance with one or more embodiments, the results from the dynamic warping is a set of correlation points that relate each point in the reference log to another point in the image run log. These correlation points are used to shift the depth in the image run log to the depth corresponding to the reference log, thereby depth calibrating the image run log.

Figure 4:
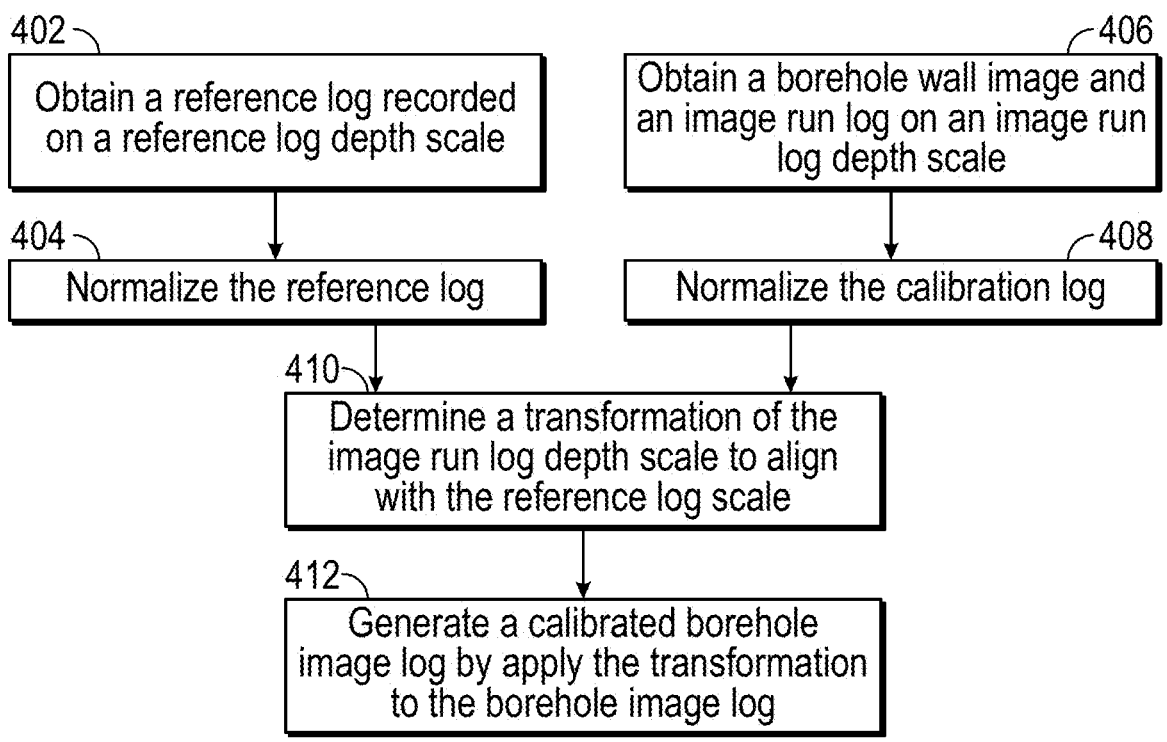
FIG. 4 shows a depth-calibration flowchart, in accordance with one or more embodiments.

FIG. 4 summarizes the depth-calibration procedure, in accordance with one or more embodiments. Block 402 shows the procedure may begin, in accordance with one or more embodiments, with obtaining a reference log recorded on a reference depth scale. The reference log may measure a physical property of the rocks penetrated by the borehole at a plurality of depth sample points. The physical property may be gamma ray intensity and the reference log may be a gamma ray log. In Block 404 the reference log may be normalized. Normalization of the reference log may be achieved by dividing the value of measurement at a plurality of depth sample points by the maximum value, or the mean value, of a portion of the plurality of depth sample point values.

In Block 406, in accordance with one or more embodiments, a borehole wall image and an image run log on an image run log depth scale may be acquired. The borehole wall image may be obtained using ultrasonic transducers, or using electromagnetic transducers, or using radar transducers, or using visible light transducers. The image run log may measure the same physical property as the reference log obtained in Block 402.

In Block 408 the image run log may be normalized. Normalization of the image run log may be achieved by dividing the value of measurements at a plurality of depth sample points by the maximum value, or the mean value, of a portion of the plurality of depth sample point values.

In Block 410 the transformation of the depth-shift factors, and the depth-stretch factors needed to align the image run log depth scale with the reference log depth scale may be determined, in accordance with one or more embodiments. The depth-shift factors may be calculated by either the cross-correlation method illustrated in FIG. 2, or by the dynamic warping method illustrated in FIG. 4. In addition, in accordance with one or more embodiments, the depth-stretch factors may be calculated using the dynamic warping method illustrated in FIG. 4.

In Block 412, in accordance to one or more embodiments, the depth-shift factors and the depth-stretch factors may be applied to the image run log depth scale and to the borehole wall image to generate a depth-calibrated borehole wall image (240).

The cavity, or artifact, left by the sidewall core sampling is roughly circular. Therefore, a method for detecting a circle in an image may be used to identify these artifacts in the depth-calibrated borehole wall image (240). The circle Hough transform is a robust method for detecting circles in an image.

Figure 5:
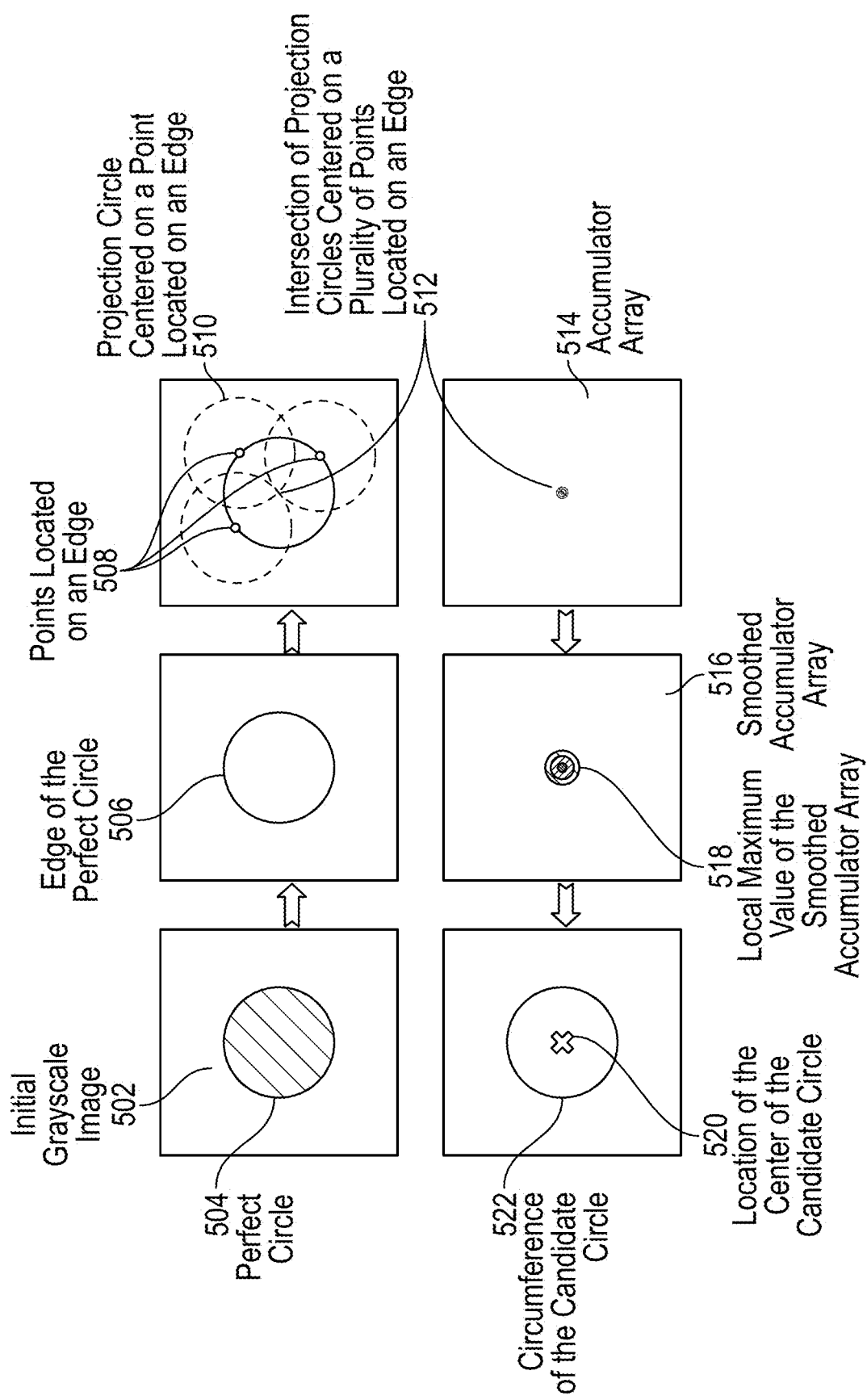
FIG. 5 shows an example of the circle Hough transform, in accordance with one or more embodiments.

FIG. 5 shows the initial, intermediate, and final steps in applying the circle Hough transform. The initial step may to obtain an initial grayscale image (502). In this example we use an image of a perfect circle (504). The next step, according to one or more embodiments, may be to apply an edge detection algorithm to identify the edge of the circle (506). In general, an image may have many edges associated with many different shapes and the challenge is to identify the circles and discard the other edges.

The next step in the circle Hough transform is to choose a plurality of points (508) located on all the identified edges (506). Each of the plurality of points is treated as the center of a projection circle (510), and a unit increment may be made to an accumulator array (514) along the locus of points defined by the circumference of each of the projection circles (510).

If the radius of the circles sought in the initial image (502) is known then the radius of the projection circles (510) is set equal to the radius of the circles sought in the initial image (502). In this case the accumulator array (514) may be two dimensional. In accordance with one or more embodiments, if the radius of the circle sought in the initial image (502) is not known, then radii of the projection circles (510) used may range over a variety of values. In this case the accumulator array (514) may become three dimensional, with the third dimension tracking the range of radius values of the projection circles (510). In other embodiments, even if the radius of the circle sought in the initial image (502) is not known, then a 2D accumulator (514) may still be used in an initial step, and then the radius of the circles sought in the initial image (502) may be estimated in a second step after the location of the center of the circle has been estimated.

The location in the accumulator array (514) corresponding to the intersection of many projection circles (512) may accumulate a large value. Other locations in the accumulator array (514) which do not lie on the circumference of many projection circles (510) may accumulate smaller values. Thus, the probable location of the center of the circle sought in the initial image (502) may be at points in the accumulator array (514) that accumulate large values.

In accordance with one or more embodiments, after the contributions to the accumulator array (514) from all the projection circles (510) centered on all the plurality of points location on the edges (508) identified in the initial image (502) have been accumulated, the accumulator array may be smoothed to generate a smoothed accumulator array (516). The smoothing may be done with any smoothing filter including, for example, a Gaussian smoothing filter. Then, one or more local maximum values of the smoothed accumulator array (518) may be identified as locations of the center of the candidate circles (520) sought in the initial image (502). The location of the center of the candidate circle (520) and radius of the projection circles (510) may be combined to determine the circumference of the candidate circle (522).

When applied to a depth-calibrated borehole wall image (24) the candidate circles (522) identified by the circle Hough transform may be treated as candidate sidewall core artifacts.

Figure 6:
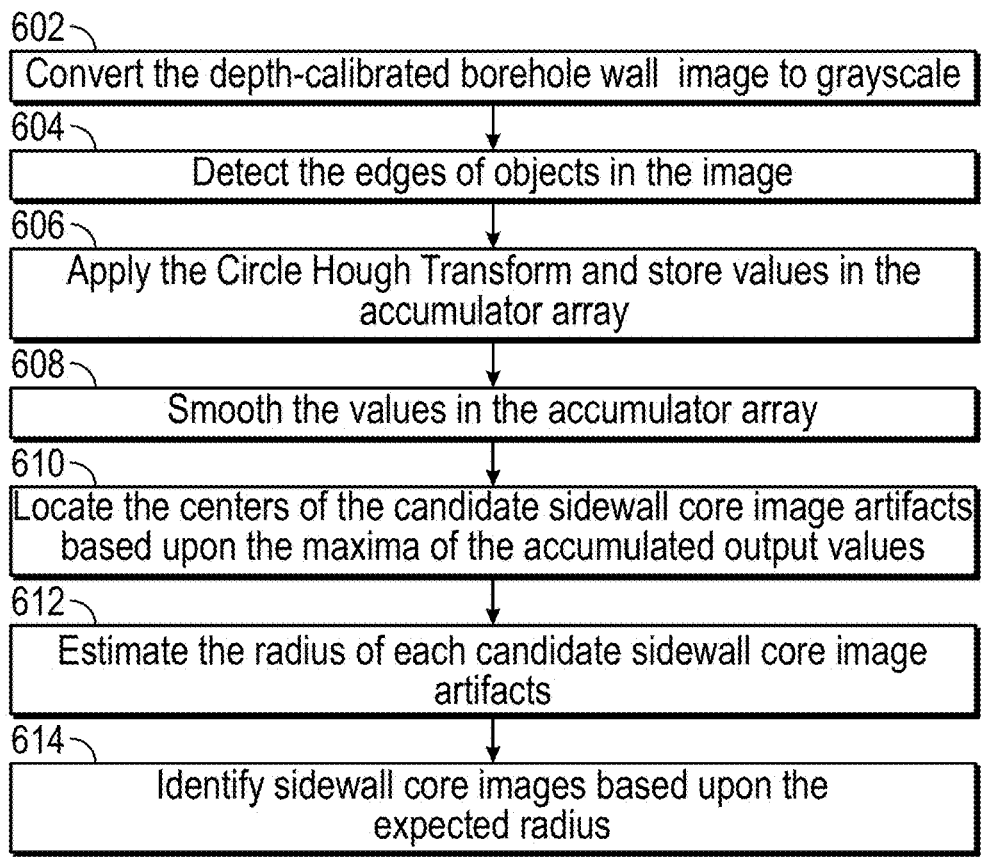
FIG. 6 shows a candidate sidewall core artifact identification flowchart, in accordance with one or more embodiments.

FIG. 6 shows a flowchart for identifying a candidate sidewall core artifact, in accordance with one or more embodiments. In Block 602, the depth-calibrated borehole wall image may be converted into a grayscale image (502). In Block 604, the edges of objects (506) in the grayscale image (502) may be determined. In Block 606, the circle Hough transform may be applied to a portion of the edges (506) detected in the grayscale image (502) and the resulting values may be summed in the accumulator array (514).

In Block 608, in accordance with one or more embodiments, the values accumulated in the accumulator array may be smoothed. The smoothing may be done by applying a multi-dimensional Gaussian smoothing filter. In other embodiments, the smoothing filter may be a mean filter, or a non-local mean filter, or a median filter, or any other filter which outputs a low-wavenumber version of the input.

In Block 610, in accordance with one or more embodiments, the location of candidate sidewall core image artifacts are identified based, at least in part, on the location of local maxima values of the smoothed accumulator array. In addition, in some embodiments, the value of the accumulator array at the local maxima may be stored to further characterize the candidate sidewall core image artifact.

In accordance with one or more embodiments, the radius of each sidewall core image artifact may be estimated in Block 612. To estimate the radii of the identified circles, a number of methods can be used. In one embodiment, Blocks 606, 608 and 610 may be repeated for different projection circle (510) radii, and a histogram of accumulator array values may be stored and the peak value of the histogram may be used, at least in part, to identify the circle in the initial grayscale image (502). In further embodiments, in Block 606, all accumulator array (514) locations within a projection circle (510) having a user-determined maximum value may be updated by phase encoded increment which may be used, in part, to determine the radius of the candidate sidewall core image artifact.

In Block 614, in accordance with some embodiments, the candidate sidewall core image artifacts (216A, 216B) may be categorized according to their estimated radii. Furthermore, only the candidate sidewall core image artifacts (216A, 216B) with radii that may fall within an expected range of values may be retained for further analysis. The expected range of radii for a candidate sidewall core image artifacts (216A, 216B) may depend upon, without limitation, the diameter of the sidewall core sample taken from the borehole wall, and the diameter of the borehole.

An important advantage of the circle Hough transform may be its robustness to noise, irregularities, and missing data. The circle Hough transform may be able to detect circular features even after adding complexities, such as portions of missing data (118) in the image, caused by the design of downhole tool used to acquire the borehole wall image (110) as well as by malfunctions in the downhole tool used to acquire the borehole wall image (110).

Another important characteristic of using the circle Hough transform for circle identification is the circle Hough transform allows the candidate sidewall core image artifacts (216A, 216B) to be easily ranked by confidence in their identification, based on the values of the accumulator array (514). This ease of ranking is important in uncertainty analysis.

In accordance with one or more embodiments, each candidate sidewall core image artifacts (216A, 216B) may be assigned one or more metrics, which may reflect the certainty with which the candidate sidewall core image artifact has been correctly identified. The first confidence metric, $m_1$, quantifies how much of the area of the candidate sidewall core image artifact intersect with a portion of missing data (118):

$$m_1 = cc = \frac{n_d}{n_p}, \quad \text{Equation (4)}$$

where $n_p$ is the number of pixels within candidate sidewall core image artifact and $n_d$ indicates a pixel containing good data. $m_1=1$ indicates there is no missing data within the candidate sidewall core image artifact.

In accordance with one or more embodiments, a second confidence metric $m_2$, may be defined to quantify how many of the projection circles (510) intersect at the center of the candidate sidewall core image artifact:

$$m_2 = \frac{aa}{cc}, \quad \text{Equation (5)}$$

where aa is value of the smoothed accumulator array at the center of the candidate sidewall core image artifacts.

In accordance with one or more embodiments, a third confidence metric $m_3$, may be defined to quantify the mean value of the pixels falling within a candidate sidewall core image artifact (216A, 216B):

$$m_3 = \frac{\Sigma_p a_p}{n_p}, \quad \text{Equation (6)}$$

where $a_p$ is the amplitude of the p-th pixel located within the candidate sidewall core image artifact.

In accordance with one or more embodiments, a fourth confidence metric $m_4$, may be defined to quantify the uniformity of the initial grayscale image (502) within the candidate sidewall core image artifact:

$$m_4 = \frac{\Sigma_{p_e} a_{p_e}}{n_{p_e}} - \frac{\Sigma_p a_p}{n_p}, \quad \text{Equation (7)}$$

where $a_{p_e}$ are the amplitude of the pixels, $p_e$, near the edge of the candidate sidewall core image artifact, and $n_{p_e}$ is the total number of these edge pixels.

In accordance with one or more embodiments, a fifth confidence metric $m_5$, may be also defined to quantify the uniformity of the initial grayscale image (502) within the candidate sidewall core image artifact:

$$m_5 = 1 - \sqrt{\frac{1}{n_p}\Sigma_p\left(a_p - \frac{\Sigma_p a_p}{n_p}\right)^2}, \quad \text{Equation (8)}$$

where $m_5$ is a modified version of the standard deviation of pixel values within the initial grayscale image (502) of the candidate sidewall core image artifact. The modification results in a candidate sidewall core image artifact with more uniform pixel values to have a higher value of $m_5$.

In accordance with one or more embodiments, one or more of the confidence metrics described in equations (4), (5), (6), (7), and (8), may be normalized and combined, after multiplication with varying weighting factors, to generate a single combine confidence factor, $M_i$, where i enumerates the candidate sidewall core image artifact. $M_i$ represents a quantified estimate of the certainty with which a candidate sidewall core image artifact represents a sidewall core sample point.

In accordance with one or more embodiments, the probability that a sidewall core sample was taken at a depth=D in the borehole may be determined using Bayesian statistics. This probability may be expressed as:

$$P(D|IL) = \frac{P(IL|D)P(D)}{P(IL)} \quad \text{Equation (9)}$$

where P(D|IL) is the posterior distribution function given prior probability, P(D), the likelihood, P(D|IL), that the borehole wall image log represents a sidewall core sample taken at depth, D, and a marginal, probability distribution function P(IL), which acts as a normalization factor.

In some embodiments, the prior probability distribution, P(D), may be a simple Gaussian distribution function $$P(D) = \frac{1}{\sigma\sqrt{2\pi}} e^{-\frac{1}{2}\left(\frac{D-D_E}{\sigma}\right)^2},$$

where $D_E$ is the expected depth of the sidewall core sample, and $\sigma$ represents the standard deviation or the width of the probability distribution. Where there is little a priori uncertainty about the depth of the sidewall core sample $\sigma$ will be small, and where there is large a priori uncertainty $\sigma$ will be large. The standard deviation $\sigma$ may be commonly set to 2 or 3 feet.

Further, in one or more embodiments, the likelihood probability distribution P(IL|D) may be calculated from the combines confidence factor, $M_i$, for the i-th candidate sidewall core image artifact, as:

$$P(IL|D) = \frac{e^{\beta M_i}}{\Sigma_j e^{\beta M_j}} \quad \text{Equation (10)}$$

where $\beta$ may be set equal to one, in one or more embodiments.

Figure 7:
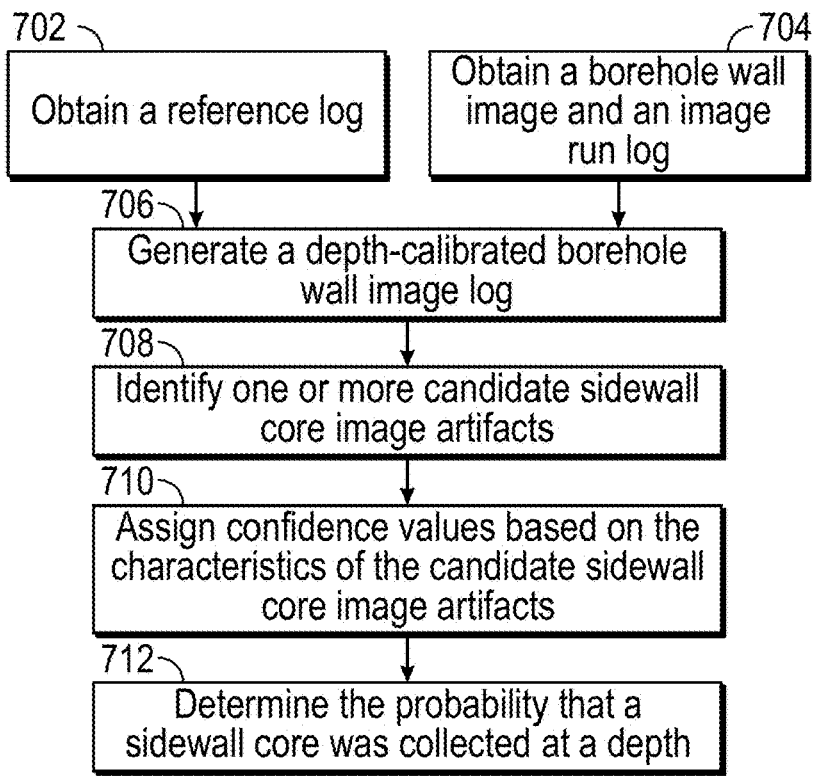
FIG. 7 shows a flowchart for determining the probability of a sidewall core sample having been taken at a given depth, in accordance with one or more embodiments.

FIG. 7 shows a flowchart, according to one or more embodiments, for determining the posterior probability distribution for the depth at which a sidewall core sample has been acquired, given a prior probability and a borehole wall image log. In Block 702, according to one or more embodiments, a reference log may be obtained. The reference log may be taken to be the depth reference for the borehole. In Block 704, according to one or more embodiments, a borehole wall image and an image run log, acquired together, may be obtained. In Block 706, one or more depth-shift factors, and one or more depth-stretch factors may be determined based, at least in part, on a comparison between the reference log and the image run log. The depth-shift factors, and depth-stretch factors may be identified using a cross correlation between the reference log and the image run log. The depth-shift factors, and depth-stretch factors may be identified using dynamic warping. Furthermore, in 706 the depth-shift factors and the depth-stretch factors may be applied to the depth scale of the borehole wall image to generate a depth-calibrated borehole wall image.

In Block 708, in accordance with some embodiments, one or more candidate sidewall core image artifacts may be identified. The sidewall core image artifacts may be identified using the circle Hough transform. In Block 710, according to one or more embodiments, one or more confidence values may be assigned to each candidate sidewall core image artifacts based, at least in part, on the borehole wall image.

In Block 712, in accordance with one or more embodiments, the probability of a sidewall core sample was acquired at a depth may be determined using Bayesian statistics and the confidence values assigned to each candidate sidewall core image artifacts.

Figure 8C:
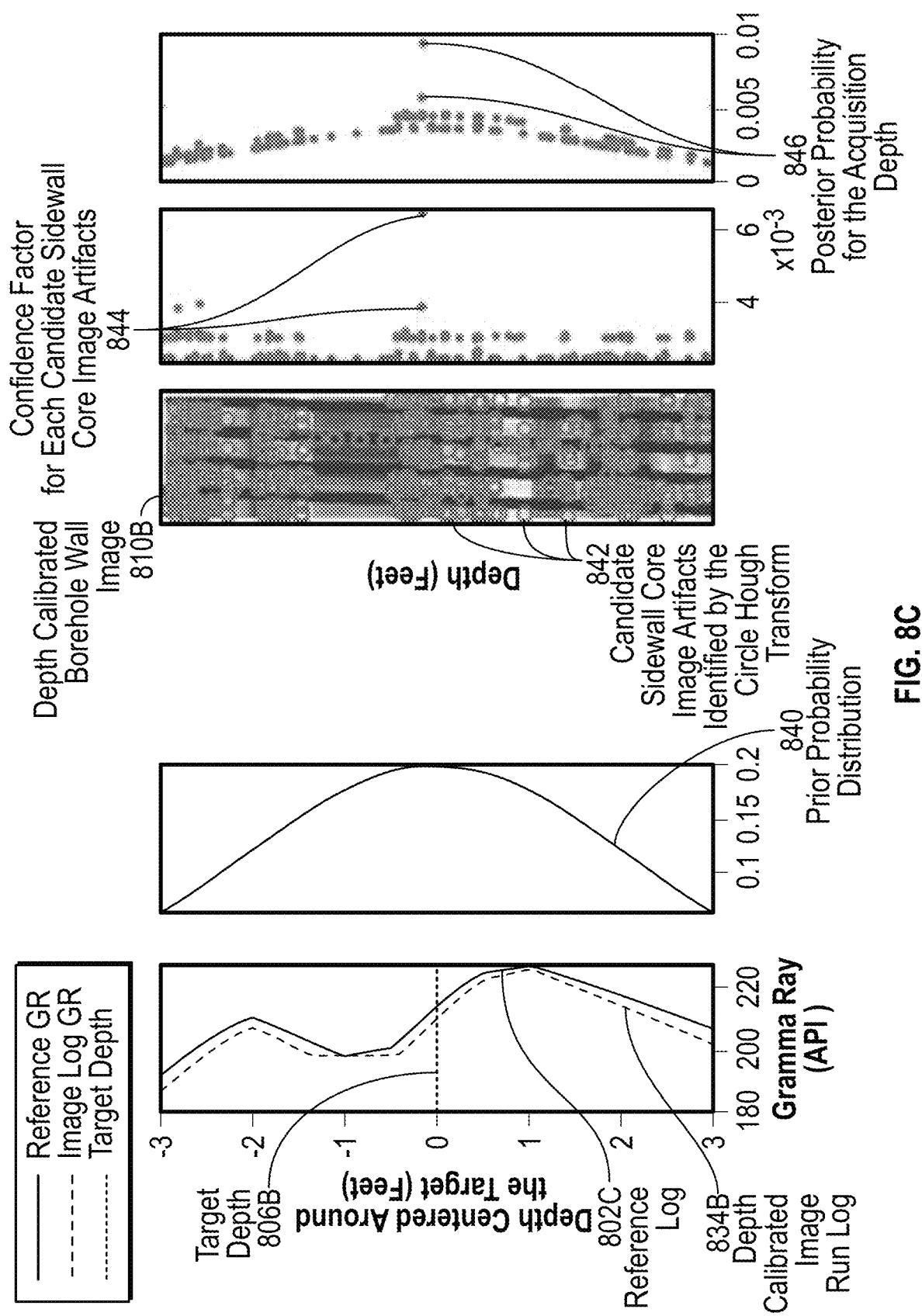
FIG. 8C an example of sidewall core posterior depth probability determination, accordance to one or more embodiment.

FIGS. 8A, 8B, and 8C show, in accordance with one or more embodiments, an example of the determination of the posterior probability distribution for the depth at which a sidewall core sample has been acquired (846), given a prior probability distribution (840), a borehole wall image (810), an image run log (804), and a reference log (802A, 802B, 802C).

FIG. 8A shows the reference log (802A), which in this embodiment is a gamma-ray log, and the image run log (804) before depth calibration in the vicinity of a target depth (806A) where a candidate side wall core sample is thought to have been acquired. The borehole wall image (810) shows a candidate sidewall core artifact (816A) close to the target depth (806A).

FIG. 8B shows the result of depth-calibration, in accordance with one or more embodiments. The depth-calibrated image run log (834A) is now a close match to the reference log (802B). The depth calibrated borehole wall image (810A) has been depth-stretched and depth-shifted, in accordance with one or more embodiments. One of the results of the depth-shifting and depth-stretching to produce the depth calibrated borehole wall image may be to have moved the candidate sidewall core image artifact (816B) closer to the target depth than the corresponding sidewall core image artifact (816A) appeared in the borehole wall image before depth calibration (810).

Figure 9:
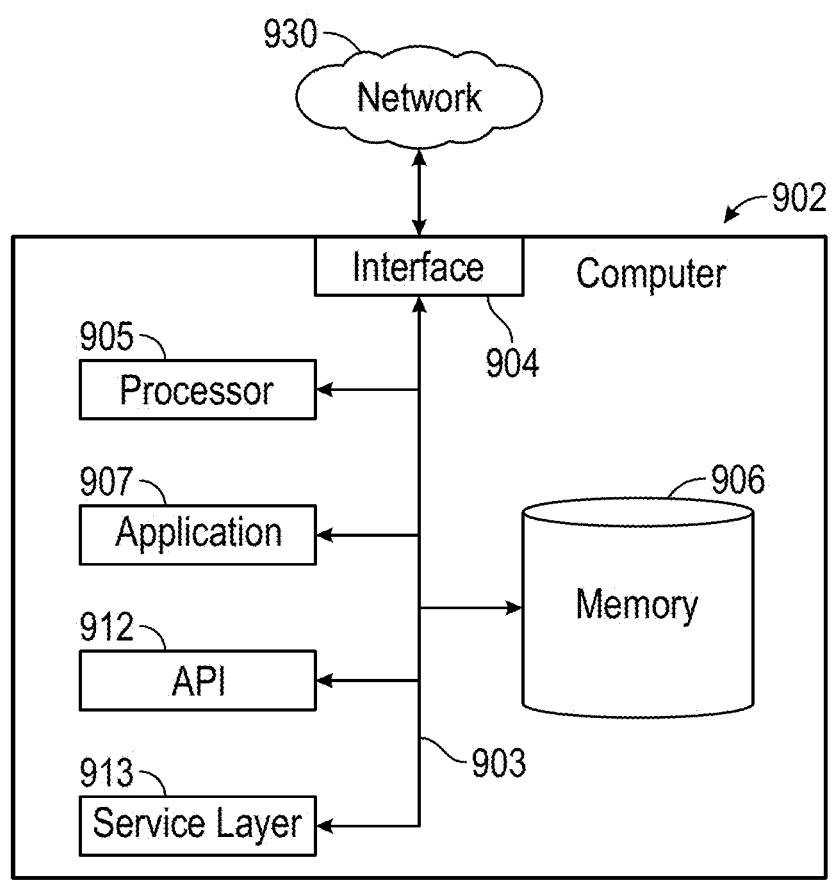
FIG. 9 shows a computer system in accordance with one or more embodiments.

FIG. 8C shows, in accordance with one or more embodiments, the procedure for combining the depth calibrated borehole wall image (810B) with the priori probability distribution (840), and with the confidence factor (844) for each candidate sidewall core image artifact (844) to obtain a posterior probability for the depth at which the sidewall core was acquired (846). The prior probability distribution (840) is peaked at the target depth (806B), reflecting the expectation that the sidewall core sample was taken at the planned, or target depth, but assigns finite probabilities that the sidewall core sample was taken at deeper or shallower depths. The depth calibrated borehole wall image (810B) is shown together with the location of all the candidate sidewall core image artifacts identified by the circle Hough transform (842). A confidence factor, $M_i$, (844) for each of the candidate sidewall core image artifacts identified by the circle Hough transform (842) may also be displayed. Finally, the posterior probability for the acquisition depth (846) may be obtained by combining the prior probability distribution (840), the confidence factor for each sidewall core image artifact (844) using Bayesian statistics Embodiments may be implemented on a computer system. FIG. 9 is a block diagram of a computer system (902) used to provide computational functionalities associated with described algorithms, methods, functions, processes, flows, and procedures as described in the instant disclosure, according to an implementation. The illustrated computer (902) is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (902) may include a computer that includes an input device, such as a keypad, keyboard, touch screen, or other device that can accept user information, and an output device that conveys information associated with the operation of the computer (902), including digital data, visual, or audio information (or a combination of information), or a GUI.

The computer (902) can serve in a role as a client, network component, a server, a database or other persistency, or any other component (or a combination of roles) of a computer system for performing the subject matter described in the instant disclosure. The illustrated computer (902) is communicably coupled with a network (930). In some implementations, one or more components of the computer (902) may be configured to operate within environments, including cloud-computing-based, local, global, or other environment (or a combination of environments).

At a high level, the computer (902) is an electronic computing device operable to receive, transmit, process, store, or manage data and information associated with the described subject matter. According to some implementations, the computer (902) may also include or be communicably coupled with an application server, e-mail server, web server, caching server, streaming data server, business intelligence (BI) server, or other server (or a combination of servers).

The computer (902) can receive requests over network (930) from a client application (for example, executing on another computer (902)) and responding to the received requests by processing the said requests in an appropriate software application. In addition, requests may also be sent to the computer (902) from internal users (for example, from a command console or by other appropriate access method), external or third-parties, other automated applications, as well as any other appropriate entities, individuals, systems, or computers.

Each of the components of the computer (902) can communicate using a system bus (903). In some implementations, any or all of the components of the computer (902), both hardware or software (or a combination of hardware and software), may interface with each other or the interface (904) (or a combination of both) over the system bus (903) using an application programming interface (API) (912) or a service layer (913) (or a combination of the API (912) and service layer (913). The API (912) may include specifications for routines, data structures, and object classes. The API (912) may be either computer-language independent or dependent and refer to a complete interface, a single function, or even a set of APIs. The service layer (913) provides software services to the computer (902) or other components (whether or not illustrated) that are communicably coupled to the computer (902). The functionality of the computer (902) may be accessible for all service consumers using this service layer. Software services, such as those provided by the service layer (913), provide reusable, defined business functionalities through a defined interface. For example, the interface may be software written in JAVA, C++, or other suitable language providing data in extensible markup language (XML) format or other suitable format. While illustrated as an integrated component of the computer (902), alternative implementations may illustrate the API (912) or the service layer (913) as stand-alone components in relation to other components of the computer (902) or other components (whether or not illustrated) that are communicably coupled to the computer (902). Moreover, any or all parts of the API (912) or the service layer (913) may be implemented as child or sub-modules of another software module, enterprise application, or hardware module without departing from the scope of this disclosure.

The computer (902) includes an interface (904). Although illustrated as a single interface (904) in FIG. 9, two or more interfaces (904) may be used according to particular needs, desires, or particular implementations of the computer (902). The interface (904) is used by the computer (902) for communicating with other systems in a distributed environment that are connected to the network (930). Generally, the interface (904 includes logic encoded in software or hardware (or a combination of software and hardware) and operable to communicate with the network (930). More specifically, the interface (904) may include software supporting one or more communication protocols associated with communications such that the network (930) or interface's hardware is operable to communicate physical signals within and outside of the illustrated computer (902).

The computer (902) includes at least one computer processor (905). Although illustrated as a single computer processor (905) in FIG. 9, two or more processors may be used according to particular needs, desires, or particular implementations of the computer (902). Generally, the computer processor (905) executes instructions and manipulates data to perform the operations of the computer (902) and any algorithms, methods, functions, processes, flows, and procedures as described in the instant disclosure.

The computer (902) also includes a memory (906) that holds data for the computer (902) or other components (or a combination of both) that can be connected to the network (930). For example, memory (906) can be a database storing data consistent with this disclosure. Although illustrated as a single memory (906) in FIG. 9, two or more memories may be used according to particular needs, desires, or particular implementations of the computer (902) and the described functionality. While memory (906) is illustrated as an integral component of the computer (902), in alternative implementations, memory (906) can be external to the computer (902).

The application (907) is an algorithmic software engine providing functionality according to particular needs, desires, or particular implementations of the computer (902), particularly with respect to functionality described in this disclosure. For example, application (907) can serve as one or more components, modules, applications, etc. Further, although illustrated as a single application (907), the application (907) may be implemented as multiple applications (907) on the computer (902). In addition, although illustrated as integral to the computer (902), in alternative implementations, the application (907) can be external to the computer (902).

There may be any number of computers (902) associated with, or external to, a computer system containing computer (902), each computer (902) communicating over network (930). Further, the term "client," "user," and other appropriate terminology may be used interchangeably as appropriate without departing from the scope of this disclosure. Moreover, this disclosure contemplates that many users may use one computer (902), or that one user may use multiple computers (902).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, any means-plus-function clauses are intended to cover the structures described herein as performing the recited function(s) and equivalents of those structures. Similarly, any step-plus-function clauses in the claims are intended to cover the acts described here as performing the recited function(s) and equivalents of those acts. It is the express intention of the applicant not to invoke 35 U.S.C. § 112(f) for any limitations of any of the claims herein, except for those in which the claim expressly uses the words "means for" or "step for" together with an associated function.

What is claimed:

1. A method of determining depth of a sidewall core sample taken from a borehole relative to a reference log of the borehole, the method comprising:
   obtaining, using a borehole image logging tool, the reference log recorded on a reference log depth scale of a portion of the borehole from which the sidewall core sample has been taken;
   obtaining, using the borehole image logging tool, a borehole image log recorded on a borehole image log depth scale of the portion of the borehole from which the sidewall core sample has been taken;
   generating, by a computer processor, a calibrated borehole image log from the borehole image log and the reference log;
   identifying, using a circle Hough transform, by the computer processor, a candidate sidewall core image artifact in the calibrated borehole image log;
   assigning, by the computer processor, a confidence value for the candidate sidewall core image artifact based on a characteristic of the candidate sidewall core image artifact; and
   determining, by the computer processor, using the confidence value, a probability that the sidewall core sample was collected at a certain depth on the reference log depth scale.

2. The method of claim 1, wherein obtaining the borehole image log of the portion of the borehole from which the sidewall core sample has been taken, further comprises obtaining a calibration log recorded on the borehole image log depth scale of a same physical quantity represented by the reference log.

3. The method of claim 2, wherein the calibration log of the same physical quantity represented by the reference log is a gamma ray log.

4. The method of claim 2, wherein the calibration log of the same physical quantity represented by the reference log is a resistivity log.

5. The method of claim 2, wherein the calibration log of the same physical quantity represented by the reference log is a density log.

6. The method of claim 1, wherein generating the calibrated borehole image log from the borehole image log and the reference log further comprises:
   determining, by the computer processor, a transformation of the borehole image log depth scale required to align the borehole image log depth scale with the reference log depth scale, and;
   applying the transformation to the borehole image log.

7. The method of claim 6, wherein determining the transformation of a calibration log depth scale and applying the transformation is performed by dynamic depth warping.

8. The method of claim 6, wherein determining the transformation of a calibration log depth scale is performed by cross-correlation.

9. The method of claim 1, wherein assigning the confidence value for the candidate sidewall core image artifact are based on one or more values selected from a group consisting of a circle identification confidence, a coverage of the circle, a mean intensity of pixel values within the circle, and a uniformity of values within the circle.

10. The method of claim 1, wherein determining, using the confidence value, the probability that the sidewall core was collected at the certain depth on the reference log depth scale is performed using Bayesian statistics.

11. The method of claim 1 further comprising:
    determining a most probable location on the reference log depth scale at which the sidewall core sample was taken; and
    validating the most probable location by comparing the reference log value with a depth calibrated image run log value at the most probable location.

12. A non-transitory computer readable medium storing instructions executable by a computer processor, the instructions comprising functionality for:
    obtaining, using a borehole image logging tool, a reference log recorded on a reference log depth scale of a portion of a borehole from which a sidewall core sample has been taken;
    obtaining, using the borehole image logging tool, a borehole image log recorded on a borehole image log depth scale of the portion of the borehole from which the sidewall core sample has been taken;
    generating, by the computer processor, a calibrated borehole image log from the borehole image log and the reference log;
    identifying, using a circle Hough transform, by the computer processor, a candidate sidewall core image artifact in the calibrated borehole image log;
    assigning, by the computer processor, a confidence value for the candidate sidewall core image artifact based on a characteristic of the candidate sidewall core image artifact; and
    determining, by the computer processor, using the confidence value, a probability that the sidewall core was collected at a certain depth on the reference log depth scale.

13. The non-transitory computer readable medium of claim 12, wherein the instructions further comprise functionality for:
    generating the calibrated borehole image log from the borehole image log and the reference log, by:
      determining a transformation of a calibration log depth scale required to align the calibration log depth scale with the reference log depth scale; and
      applying the transformation to the borehole image log.

14. The non-transitory computer readable medium of claim 12, wherein the instructions further comprise functionality for determining a transformation of a calibration log depth scale by performing dynamic depth warping.

15. The non-transitory computer readable medium of claim 12, wherein the instructions further comprise functionality for determining a transformation of a calibration log depth scale by performing cross-correlation.

16. The non-transitory computer readable medium of claim 12, wherein the instructions further comprise functionality for assigning the confidence value for the candidate sidewall core image artifact are based on one or more values selected from a group consisting of a circle identification confidence, a coverage of the circle, a mean intensity of pixel values within the circle, and a uniformity of values within the circle.

17. The non-transitory computer readable medium of claim 12, wherein the instructions further comprise functionality for determining, using the confidence value, the probability that the sidewall core was collected at the certain depth on the reference log depth scale using Bayesian statistics.

18. The non-transitory computer readable medium of claim 12, wherein the instructions further comprise functionality for:
- determining a most probable location on the reference log depth scale at which the sidewall core sample was taken; and
- validating the most probable location by comparing the reference log value with a depth calibrated image run log value at the most probable location.

* * * * *